US009337974B2

(12) United States Patent
Miao et al.

(10) Patent No.: US 9,337,974 B2
(45) Date of Patent: May 10, 2016

(54) USER EQUIPMENT GENERATION AND SIGNALING OF FEEDBACK FOR SUPPORTING ADAPTIVE DEMODULATION REFERENCE SIGNAL TRANSMISSION

(71) Applicant: Intel IP Corporation, Santa Clara, CA (US)

(72) Inventors: Honglei Miao, Nuremberg (DE); Rajarajan Balraj, Nuremberg (DE); Biljana Badic, Düsseldorf (DE); Chun-Hsuan Kuo, San Diego, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 111 days.

(21) Appl. No.: 14/229,529

(22) Filed: Mar. 28, 2014

(65) Prior Publication Data
US 2015/0282123 A1 Oct. 1, 2015

(51) Int. Cl.
| | | |
|---|---|---|
| H04W 72/04 | (2009.01) | |
| H04L 5/00 | (2006.01) | |
| H04W 48/00 | (2009.01) | |
| H04W 28/06 | (2009.01) | |

(52) U.S. Cl.
CPC ............. *H04L 5/0035* (2013.01); *H04W 48/00* (2013.01); *H04W 28/06* (2013.01)

(58) Field of Classification Search
CPC . H04W 72/042; H04W 72/082; H04L 5/0035
See application file for complete search history.

(56) References Cited

U.S. PATENT DOCUMENTS

| | | | |
|---|---|---|---|
| 2002/0172307 A1 | 11/2002 | Sandberg | |
| 2005/0201295 A1* | 9/2005 | Kim | H04L 1/0026 370/241 |
| 2011/0019776 A1 | 1/2011 | Zhang et al. | |
| 2011/0141941 A1* | 6/2011 | Lee | H04L 1/0038 370/252 |
| 2011/0237283 A1 | 9/2011 | Shan et al. | |
| 2013/0194931 A1* | 8/2013 | Lee | H04L 5/0053 370/241 |
| 2013/0336280 A1 | 12/2013 | Nordstrom et al. | |
| 2014/0036804 A1* | 2/2014 | Chen | H04W 72/0406 370/329 |
| 2014/0302887 A1* | 10/2014 | Bashar | H04W 76/00 455/550.1 |
| 2015/0148050 A1* | 5/2015 | Siomina | H04J 11/005 455/452.1 |

FOREIGN PATENT DOCUMENTS

WO 2013077661 A1 5/2013

OTHER PUBLICATIONS

Broadcom Corporation, "Adaptive UE Specific Reference Signal Design", R1-131321, 3GPP TSG RAN WG1 Meeting #72bis, Chicago, United States, Apr. 15-19, 2013, 4 pages.
PCT/US2015/017747, International Search Report and Written Opinion, May 19, 2015, 13 pages.

* cited by examiner

*Primary Examiner* — Kashif Siddiqui
(74) *Attorney, Agent, or Firm* — Stoel Rives LLP; Robert R. Teel

(57) ABSTRACT

Disclosed are UE-feedback techniques to support the adaptive DMRS transmission. A UE and eNB support adaptive DMRS transmission in which an eNB adjusts (i.e., selects) a DMRS pattern based on information describing channel conditions perceived by the UE. The UE may explicitly provide the channel conditions, or implicitly provide them by selecting a desired DMRS pattern.

19 Claims, 4 Drawing Sheets

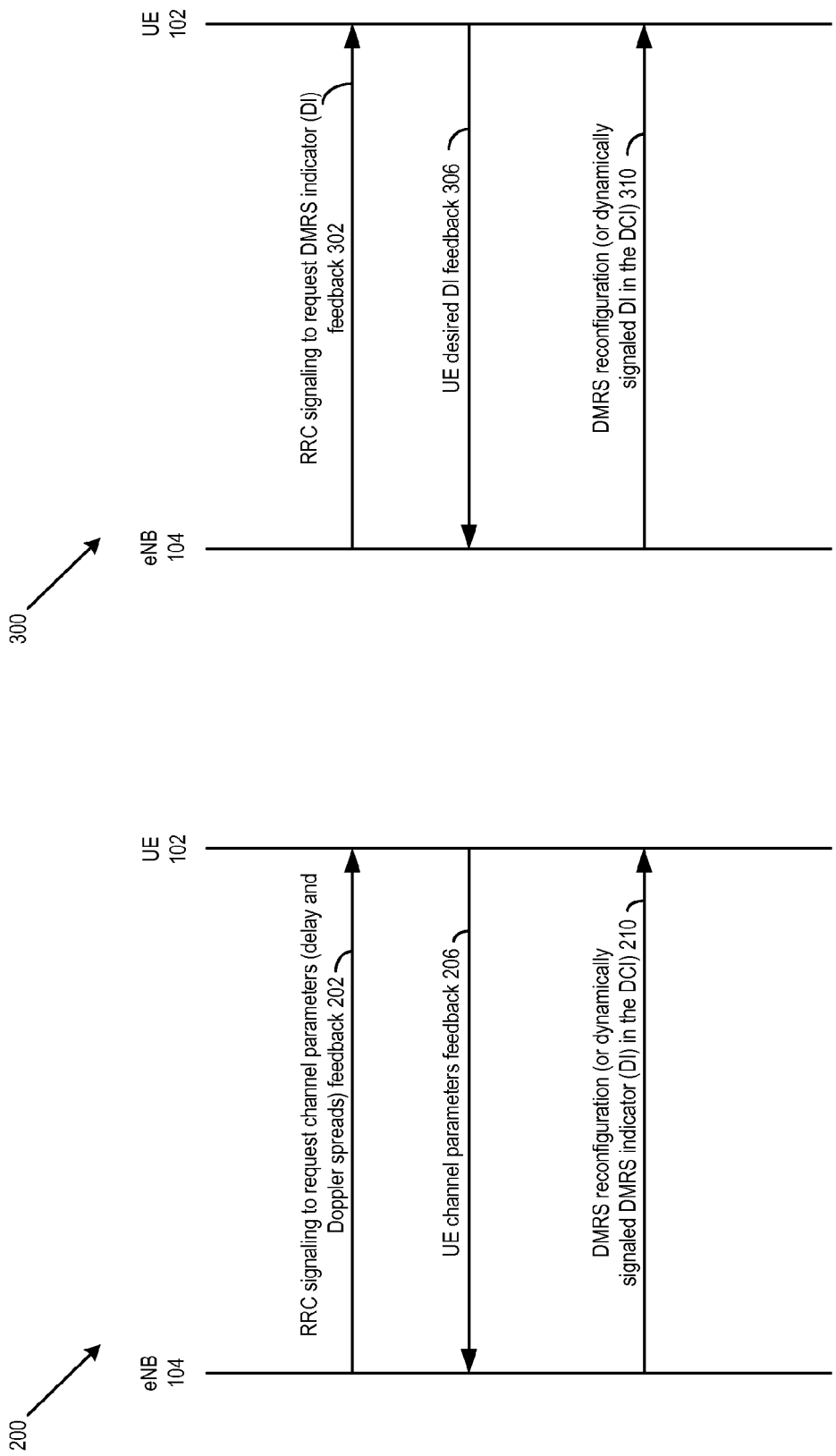

USER EQUIPMENT GENERATION AND SIGNALING OF FEEDBACK FOR SUPPORTING ADAPTIVE DEMODULATION REFERENCE SIGNAL TRANSMISSION

TECHNICAL FIELD

The present disclosure relates generally to a long term evolution (LTE) wireless network demodulation reference signal (DMRS) provided by an evolved universal mobile telecommunications system terrestrial radio access network node b (also known as an evolved node b, or simply eNB) to a user equipment device (also known as a UE device, or simply UE) for downlink channel estimation at the UE, and, more particularly, to adaptive DMRS transmission.

BACKGROUND INFORMATION

Channel estimation is a process by which a received wireless signal is adjusted by compensating for signal distortion caused by wireless channel fading. For example, fading causes signal strength to fluctuate rapidly due to multipath-time delay in a wireless communication system environment. Accordingly, to determine how the signal has been distorted, a reference signal known to both a transmitter and a receiver is transmitted through the channel so that the receiver can determine and compensate for wireless channel conditions affecting the reference signal.

A reference signal in an LTE wireless network is a signal having characteristics known to both a mobile station (e.g., a UE) and a base station (e.g., an eNB). Uplink reference signals are those that are produced by the UE for reception at the eNB. Downlink reference signals are those that are produced by the eNB for reception at the UE. Examples of downlink reference signals, explained in the following paragraphs, include a cell-specific reference signal (CRS), a UE-specific reference signal (DMRS), and a channel state information reference signal (CSI-RS).

In LTE release version no. 8 (LTE Rel-8) systems, many wireless communications facilities employ CRSs. For example, the following LTE components all use CRS-based channel information: physical downlink shared channel (PDSCH) demodulation, reference signal received power (RSRP) and reference signal received quality (RSRQ) (RSRP/RSRQ) measurements ranking candidate cells for handover and cell reselection decision, channel quality indicator (CQI) feedback, pre-coding matrix indicator (PMI) feedback, rank indication (RI) feedback, and other parameters.

In the LTE release version no. 10 (LTE Rel-10) standard, the fundamentally CRS-centric system was complemented by a UE-centric reference signal system. The UE-centric reference signals include DMRSs and CSI-RSs that a UE uses to acquire channel state information. These UE-centric reference signals fulfill a number of design goals, including reducing the reference signal overhead, providing interference measurability, reducing reference signal interference for coordinated multi-point (CoMP) transmission/reception (e.g., CoMP scenario 4 characterized by one common cell-ID shared among multiple cells), and other goals. Developing standard sets of predefined reference signals to address numerous channel and device deployment scenarios, however, is an ongoing challenge.

BRIEF DESCRIPTION OF THE DRAWINGS

FIG. 2 is a message sequence chart showing messages between an eNB and a UE, according to a first embodiment.

FIG. 3 is a message sequence chart showing messages between an eNB and a UE, according to a second embodiment.

DETAILED DESCRIPTION OF EMBODIMENTS

Figure 1:
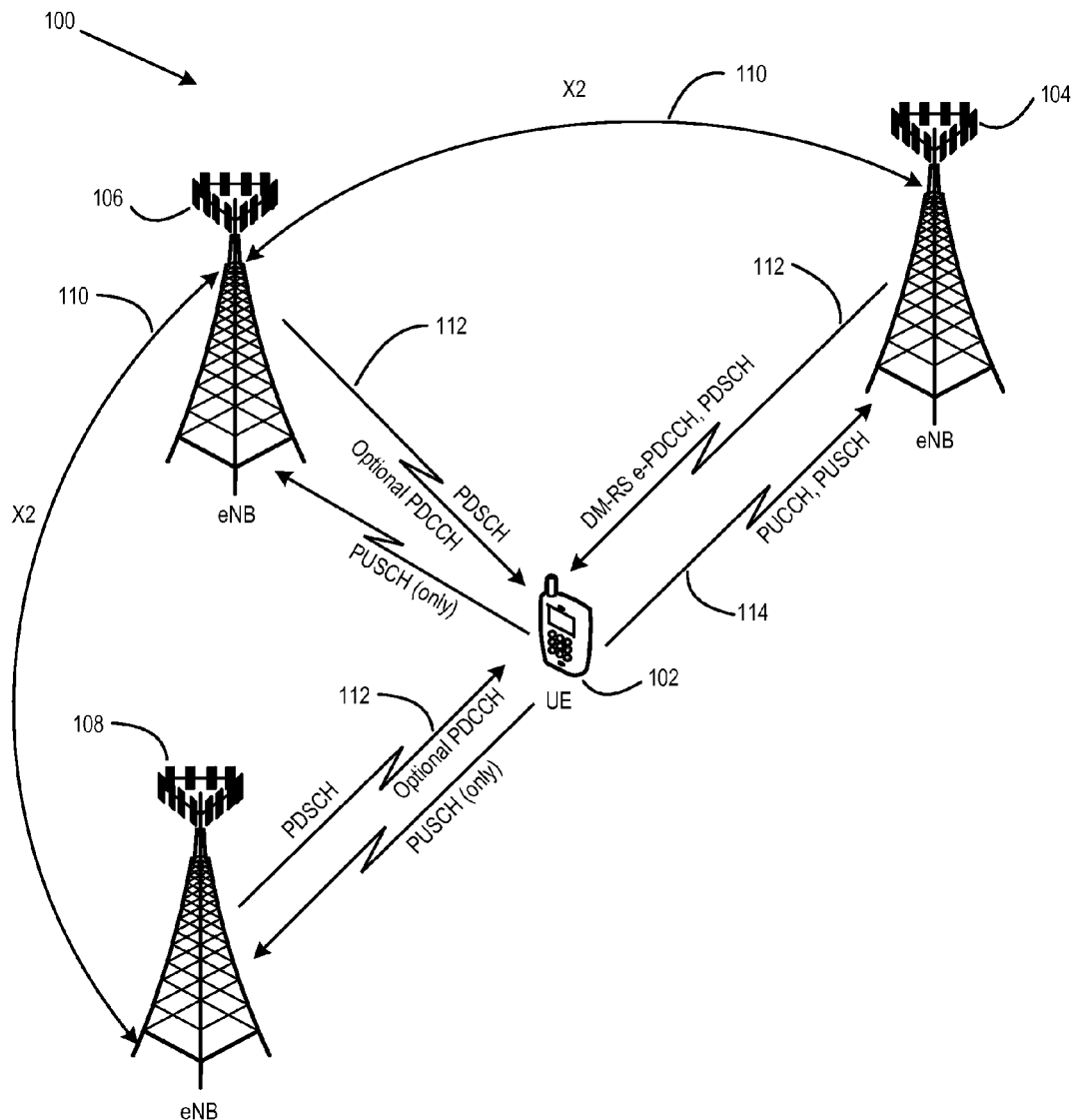
FIG. 1 is a block diagram of a wireless network in accordance with some embodiments.

The Third-Generation Partnership Project™ (3GPP) Technical Specifications Group (TSG) Radio Access Network (RAN) Working Group 1 (WG1) has determined objectives for a small cell enhancement (SCE) study item. One objective includes studying potential enhancements to improve the spectrum efficiency (i.e., improving maximum user throughput in typical coverage situations and with typical terminal configurations) for small cell deployments. Accordingly, some potential enhancements noted for further study include: introduction of a higher order modulation scheme, e.g., 256 quadrature amplitude modulation (QAM), for the LTE wireless network downlink channel; and further overhead reduction for LTE reference signals, control signals, and feedback in downlink and uplink channels based on existing channel and signal standards.

Motivated by the aforementioned objectives and potential enhancements, the following two suggestions for reducing DMRS overhead have been contemplated. First, new DMRS placement patterns have been studied. A new DMRS pattern—i.e., the DMRS location in time/frequency RE orthogonal frequency division multiple access (OFDMA) grid of a physical resource block (PRB) for a particular downlink subframe configuration (antenna number, cyclic prefix, subframe configuration, or other parameters)—would be selected to reduce the training sequence overhead associated with the LTE Rel-10 standard DMRS patterns. Second, an adaptive DMRS transmission scheme has been proposed by Broadcom Corporation in RAN 1-72bis, titled, "Adaptive UE Specific Reference Signal Design." In this proposal, a set of DMRS patterns is specified in the 3GPP standard, and the transmission of a particular DMRS pattern in the predefined set can be semi-statically or dynamically signaled to the UE based on a modulation scheme or deployment scenario. For example, in the case where a DMRS pattern is dependent on a modulation and coding scheme (MCS), the DMRS pattern selected by the eNB may be implicitly signaled to the UE when the eNB signals the MCS of the scheduled physical downlink shared channel (PDSCH) transmission.

An eNB can perform the adaptive DMRS pattern selection described in the aforementioned proposal when the eNB has knowledge of channel characteristics such as, for example, multipath-time delay spread and Doppler spread (or simply delay and Doppler spreads) of the wireless communication channel. For example, when the channel exhibits a highly frequency-selective fading behavior, then an eNB should select a DMRS pattern having a high density (a high number of resource elements). Otherwise, a lower-density DMRS pattern would be sufficient. Accordingly, the eNB would use channel condition information to select an appropriate DMRS pattern. However, the channel condition in the frequency division duplex (FDD) downlink is currently perceived only at the UE side, and the eNB does not currently receive UE-generated feedback (or simply UE feedback) concerning channel characteristics. Furthermore, channel estimator modules of various types of UEs perform differently due to implementation differences. As such, even under identical channel conditions, two UEs equipped with different channel estimators may benefit by receiving two different DMRS patterns that accommodate the different channel estimation performances.

Current LTE wireless network systems lack mechanisms for providing adaptive DMRS transmission in which an eNB adjusts (i.e., selects) a DMRS pattern based on information describing channel conditions perceived by the UE. The present disclosure, therefore, describes UE-feedback mechanisms to support the adaptive DMRS transmission.

Aspects and advantages will be apparent from the following detailed description of embodiments, which proceeds with reference to the accompanying drawings. Initially, the description of FIG. 1 provides an overview of a wireless network including a UE and eNBs. Description of FIGS. 2 and 3 provides two respective UE-feedback mechanisms to support the adaptive DMRS transmission, and description of FIG. 4 explains how a UE selects a desired DMRS pattern. An example UE is shown and described with reference to FIG. 5.

A. LTE Wireless Network Example

FIG. 1 illustrates a wireless network in accordance with some embodiments. A wireless network 100 includes a UE 102 (see also FIG. 5) and a plurality of eNBs 104, 106, and 108 providing communication services to UEs, such as UE 102. In some embodiments, eNBs 104, 106, and 108 may communicate with one another over an X2 interface 110. Each eNB 104, 106, and 108 may be associated with a set of one or more serving cells that may include macrocells and smallcells.

Serving cells (PCells and SCells) may be operated on one or more eNBs. For example, a PCell is served from a macrocell of eNB 104, an SCell is served from a smallcell of eNB 106, and those serving cells communicate through the X2 interface 110. Typically, a PCell is configured with one physical downlink control channel (PDCCH) and one physical uplink control channel (PUCCH). It could also have a physical downlink shared channel (PDSCH) or a physical uplink shared channel (PUSCH). An SCell could be configured with those shared channels and a PDCCH, but usually no PUCCH in conventional LTE. In some embodiments, a downlink channel 112 may include a PDSCH and PDCCH. In some embodiments, an uplink channel 114 may include a PUSCH or PUCCH.

B. UE Feedback for Adaptive DMRS Transmission

Two examples of UE feedback are described in this section with reference to the signaling diagrams of FIGS. 2 and 3. The following UE-feedback signaling procedure would be added to the existing 3GPP TS 36.213, titled, "LTE; Evolved Universal Terrestrial Radio Access (E-UTRA); Physical layer procedures." Associated testing procedures may then be added into the related specification, 3GPP TS 36.101, titled, "LTE; Evolved Universal Terrestrial Radio Access (E-UTRA); User Equipment (UE) radio transmission and reception."

B.1 Explicit Channel Condition Feedback

FIG. 2 shows a method 200 of the UE 102 explicitly signaling to the eNB 104 feedback of the delay and Doppler spreads. In the method 200, the feedback is provided aperiodically in response to a request, but regular and periodic transmission of UE feedback may also be used in some embodiments. In general, however, periodic transmission need not be used because delay and Doppler spreads are typically relatively long-term channel propagation characteristics (these parameters usually change rather slowly and gradually), so irregular transmission of UE feedback, i.e., in response to a change in channel propagation characteristics change, can be used in some embodiments.

Initially, in the method 200, the eNB 104 determines when the UE 102 should provide the more detailed CSI feedback for the sake of CQI and PMI tracking. Typically, prior to a sequential PDSCH scheduling, the eNB 104 would seek the CSI information from UE 102 by triggering a CSI feedback from the UE 102. Thus, the eNB 104 transmits radio resource control (RRC) signaling to the UE 102 requesting 202 channel parameters feedback (i.e., delay and Doppler spreads). A new radio resource control (RRC) signaling parameter indicating the eNB 104 request 202 for UE-feedback would, therefore, be added to the current LTE RRC specification, 3GPP TS 36.331, titled, "LTE; Evolved Universal Terrestrial Radio Access (E-UTRA); Radio Resource Control (RRC); Protocol specification."

In response to the eNB's 104 RRC request 202, the UE 102 transmits the channel parameters to the eNB 104 in an RRC response 206. To reduce UE-feedback overhead, delay and Doppler spreads may be quantized according to a set of finite levels corresponding to predefined DMRS patterns. A value in the set of finite levels can then be provided by the UE 102 to the eNB 104.

Based on the UE feedback, the eNB 104 determines the DMRS pattern to be used by selecting a DMRS pattern from the set of adaptive DMRS patterns. As noted previously, for example, if the channel exhibits highly frequency-selective fading, which can be derived from delay spread, then the eNB 104 selects a DMRS pattern with higher density in frequency domain; otherwise, a DMRS pattern with lower density in frequency domain is chosen to reduce the reference signal overhead. The eNB 104 then configures (or reconfigures) the selected DMRS pattern by signaling 210 it to the UE 102.

In another embodiment, the eNB 104 dynamically signals the selected DMRS pattern in each downlink control information (DCI) message. Thus, dynamic signaling on a sub-frame basis can be also used. In other words, in every sub-frame that contains a data packet, downlink control information (which schedules the data packet) is transmitted in the PDCCH to indicate the selected DMRS pattern. This entails defining a numbering system (i.e., indexing or another logical order) for DMRS patterns so that the eNB 104 can indicate an index value that corresponds to a selected DMRS pattern. Based on such a numbering system, the eNB 104 can signal which particular DMRS pattern is used for the current PDSCH transmission. The relationship between the index values and the DMRS patterns known to the UE 102 may be predefined in a 3GPP standard.

B.2 Implicit Channel Condition Feedback (UE Identification of Desired DMRS Patterns)

FIG. 3 shows a method 300 of the UE 102 implicitly signaling to the eNB 104 feedback of a preferred DMRS pattern—so-called DMRS indicator (DI) feedback—within the predefined set of DMRS patterns. Similar to the method 200, the method 300 uses aperiodic UE feedback, though periodic feedback is used in other embodiments.

Initially, the eNB 104 transmits an RRC signaling to UE requesting 302 DI feedback. A new radio resource control (RRC) signaling parameter indicating the eNB 104 request 302 for UE feedback would be added to the current LTE RRC specification, 3GPP TS 36.331.

Next, the UE 102 does not explicitly feedback the channel conditions, i.e., delay and Doppler spreads. Instead, in method 300, the UE 102 signals the preferred DMRS pattern within the predefined set of DMRS patterns. As such, the UE 102 determines and selects the DMRS pattern, and a DI feedback is provided to the eNB 104. The description of FIG. 4 in subsequent paragraphs explains how the UE 102 selects a DMRS pattern.

In some embodiments, DI feedback is a value that corresponds to an index of the selected DMRS pattern known to both the UE 102 and the eNB 104. It is also possible for UE 102 in the method 300 to signal different preferred DIs for different physical resource blocks (PRBs) or resource block groups (RBGs) according to different feedback granularity. In other words, depending on the eNB request, subband or wideband DI can be configured and reported by the UE 102. This should be also possible for method 200, which performs the DMRS pattern selection at the eNB 104 rather than at the UE 102 as in method 300.

Finally, the eNB 104 acknowledges the DI feedback by configuring (or reconfiguring) the selected DMRS pattern through RRC signaling 310 sent to the UE 102. In another embodiment, the eNB 104 dynamically signals the selected DMRS pattern in each downlink control information (DCI) message.

Typically, the eNB 104 follows a UE's feedback and selects the UE's desired DMRS pattern, because the eNB does not have another more meaningful mechanism for the selection. However, it is up to the eNB 104 to decide whether it uses a UE's feedback. In case, for some reason, the eNB 104 uses its own selection, then it would be sensible to use the DMRS pattern which is more conservative (i.e., higher DMRS density) than the one suggested by a UE.

C. Example of a UE Selecting a Desired DMRS Pattern

Figure 4:
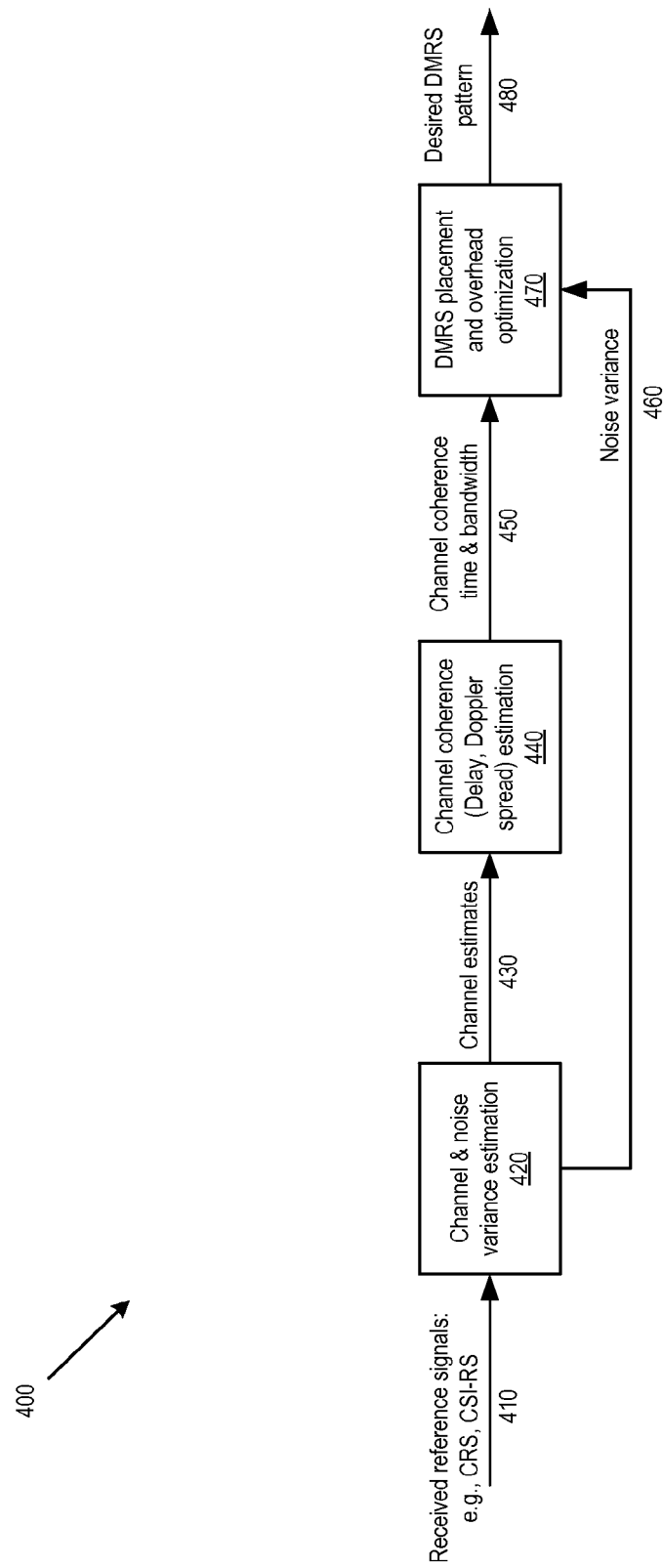
FIG. 4 is a flow diagram showing a method of a UE selecting a desired DMRS pattern.

A DMRS pattern book can be selected by the UE 102 using the example method 400 illustrated in FIG. 4. Upon receiving 410 CRSs and/or CSI-RSs, the UE 102 performs channel and noise variance estimation 420 based on information obtained from the CRSs and/or CSI-RSs to obtain channel estimates 430. Channel estimates 430 are further processed during channel coherence estimation 440, which uses estimates of delay and Doppler spreads to derive channel coherence time and coherence bandwidth 450. The channel coherence time and bandwidth 450, along with noise variance estimates 460, are then used for DMRS optimization 470, which outputs a desired DMRS pattern 480 selected from a predetermined set of patterns.

The desired pattern 480 represents an optimum trade-off between DMRS overhead and the resulting mean square error of channel estimates 430. In other words, an optimum DMRS pattern is a function of channel coherence time, coherence bandwidth, and the noise variance. For a frequency-selective fading channel, different bandwidth parts of the channel may have different coherence time and bandwidth, such that desired DMRS patterns vary for different regions of the bandwidth spectrum. Hence, a UE may propose different DMRS patterns for different parts of the whole system bandwidth.

D. Example UE Embodiment

Figure 5:
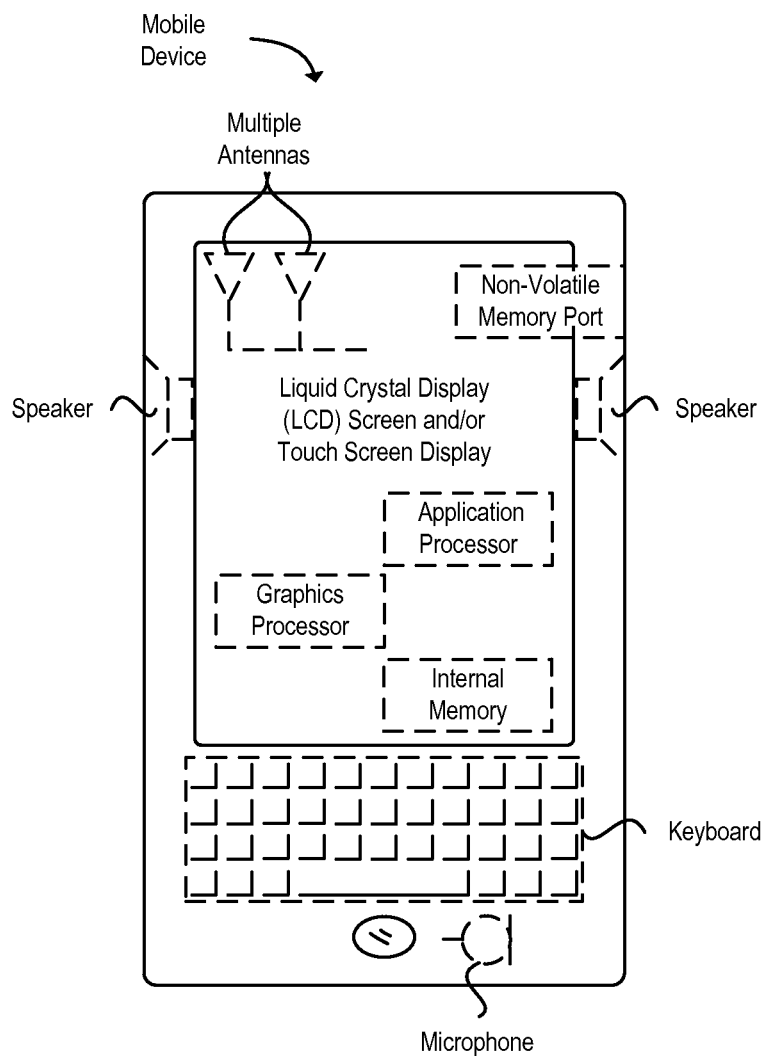
FIG. 5 is a block diagram of a UE, according to a mobile device embodiment

FIG. 5 provides an example illustration of a mobile device, commonly deployed as a UE, and referred to as a mobile station (MS), a mobile wireless device, a mobile communication device, a tablet, a handset, or another type of mobile wireless device.

The mobile device includes a modem configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 5 also provides an illustration of a microphone and one or more speakers that can be used for audio input and output from the mobile device. The display screen may be a liquid crystal display (LCD) screen, or another type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

E. Other Example Embodiments

According to one embodiment of the present disclosure, a user equipment (UE) to support adaptive demodulation reference signal (DMRS) transmission in a wireless communication downlink channel of a long term evolution (LTE) wireless network, comprises a receiver configured to receive from an evolved node b (eNB) a request for feedback of multipath-time delay and Doppler spreads estimated in the wireless communication downlink channel between the UE and eNB; a transmitter; and circuitry operatively coupled to the receiver and transmitter, the circuitry configured to estimate the multipath-time delay and Doppler spreads to establish the feedback of multipath-time delay and Doppler spreads; in response to the receiver receiving the request, cause the transmitter to transmit the feedback of multipath-time delay and Doppler spreads; and obtain with the receiver, a DMRS pattern configuration from the eNB, the DMRS configuration being based on the feedback of multipath-time delay and Doppler spreads.

According to another embodiment of the present disclosure, a user equipment (UE) to support adaptive demodulation reference signal (DMRS) transmission in a wireless communication downlink channel of a long term evolution (LTE) wireless network, comprises a receiver configured to receive from an evolved node b (eNB) a request for feedback of multipath-time delay and Doppler spreads estimated in the wireless communication downlink channel between the UE and eNB; a transmitter; means for estimating the multipath-time delay and Doppler spreads to establish the feedback of multipath-time delay and Doppler spreads; in response to the receiver receiving the request, means for causing the transmitter to transmit the feedback of multipath-time delay and Doppler spreads; and means for obtaining with the receiver, a DMRS pattern configuration from the eNB, the DMRS configuration being based on the feedback of multipath-time delay and Doppler spreads.

There are some embodiments of the UE, in which the multipath-time delay and Doppler spreads are estimated in response to the receiver receiving the request.

There are some embodiments of the UE, in which the request is made on an aperiodic basis.

There are some embodiments of the UE, in which the receiver is configured to receive the request in a radio resource control (RRC) signaling parameter.

There are some embodiments of the UE, in which the transmitter is configured to transmit the feedback of multipath-time delay and Doppler spreads in a radio resource control (RRC) signaling parameter.

There are some embodiments of the UE, in which the multipath-time delay and Doppler spreads are estimated by quantizing the multipath-time delay and Doppler spreads according to a set of finite levels corresponding to predefined DMRS patterns.

There are some embodiments of the UE, in which the receiver is configured to receive the DMRS pattern configuration in a downlink control information (DCI) message.

According to some other embodiments of the present disclosure, a user equipment (UE) to signal a desired demodulation reference signal (DMRS) pattern identified from among a predefined set of DMRS patterns associated with a downlink channel of a long term evolution (LTE) wireless network, comprises a receiver to receive from an evolved node b (eNB) a request for a DMRS indicator (DI) feedback identifying the desired DMRS pattern from among the predefined set of DMRS patterns; a transmitter; and circuitry operatively coupled to the receiver and transmitter, the circuitry configured to: obtain estimates of long-term channel properties defined by multipath-time delay and Doppler spreads; select a desired DMRS pattern from among the predefined set of DMRS patterns based on the multipath-time delay and Doppler spreads; and in response to receiving the request, cause the transmitter to transmit to the eNB the DI feedback identifying the desired DMRS pattern from among the predefined set of DMRS patterns.

According to another embodiment of the present disclosure, a user equipment (UE) to signal a desired demodulation reference signal (DMRS) pattern identified from among a predefined set of DMRS patterns associated with a downlink channel of a long term evolution (LTE) wireless network, comprises a receiver to receive from an evolved node b (eNB) a request for a DMRS indicator (DI) feedback identifying the desired DMRS pattern from among the predefined set of DMRS patterns; a transmitter; means for obtaining estimates of long-term channel properties defined by multipath-time delay and Doppler spreads; means for selecting a desired DMRS pattern from among the predefined set of DMRS patterns based on the multipath-time delay and Doppler spreads; and in response to receiving the request, means for causing the transmitter to transmit to the eNB the DI feedback identifying the desired DMRS pattern from among the predefined set of DMRS patterns.

There are some embodiments of the UE, in which the receiver is further configured to receive from the eNB a DMRS pattern configuration, the DMRS pattern configuration corresponding to the desired DMRS pattern of the DI feedback.

There are some embodiments of the UE, in which the receiver is configured to receive the request in a radio resource control (RRC) signaling parameter.

There are some embodiments of the UE, in which the transmitter is configured to transmit the DI feedback in a radio resource control (RRC) signaling parameter.

There are some embodiments of the UE, in which the DI feedback includes an index value corresponding to the selected DMRS pattern known to both the UE and the eNB.

There are some embodiments of the UE, in which the DI feedback comprises a subband DI feedback applicable for a portion of a physical downlink shared channel (PDSCH) transmission including one or more physical resource blocks (PRBs) or resource block groups (RBGs).

There are some embodiments of the UE, in which the request comprises a request for subband DI feedback.

There are some embodiments of the UE, in which the receiver is configured to receive the DMRS pattern configuration in a downlink control information (DCI) message.

According to one embodiment of the present disclosure, an evolved node b (eNB) configured to select, and transmit to a user equipment (UE), a demodulation reference signal (DMRS), comprises a transmitter configured to transmit a request for adaptive DMRS feedback; a receiver configured to receive from the UE the adaptive DMRS feedback; and circuitry configured to determine, based on the adaptive DMRS feedback, a DMRS pattern from among a predefined set of DMRS patterns; signal the determined DMRS pattern to the UE; and cause the transmitter to transmit the DMRS during a physical downlink shared channel (PDSCH) transmission.

According to another embodiment of the present disclosure, an evolved node b (eNB) configured to select, and transmit to a user equipment (UE), a demodulation reference signal (DMRS), comprises a transmitter configured to transmit a request for adaptive DMRS feedback; a receiver configured to receive from the UE the adaptive DMRS feedback; means for determining, based on the adaptive DMRS feedback, a DMRS pattern from among a predefined set of DMRS patterns; means for signaling the determined DMRS pattern to the UE; and means for causing the transmitter to transmit the DMRS during a physical downlink shared channel (PDSCH) transmission.

There are some embodiments of the eNB, in which the adaptive DMRS feedback comprises wireless channel parameter feedback including multipath-time delay and Doppler spreads.

There are some embodiments of the eNB, in which the adaptive DMRS feedback comprises an indication of a desired DMRS pattern selected by the UE.

There are some embodiments of the eNB, in which the request is transmitted using radio resource control (RRC) signaling.

There are some embodiments of the eNB, in which, in response to receiving the adaptive DMRS feedback, the determined DMRS pattern is signaled by transmitting radio resource control (RRC) signaling to reconfigure the UE to receive the DMRS used in the PDSCH transmission.

There are some embodiments of the eNB, in which, in response to receiving the adaptive DMRS feedback, the determined DMRS pattern is signaled by dynamically configuring the determined DMRS pattern in a downlink control information (DCI) message carried in the PDCCH/enhanced PDCCH (EPDCCH).

According to one embodiment of the present disclosure, a method, performed by a user equipment (UE), for supporting adaptive demodulation reference signal (DMRS) transmission in a wireless communication downlink channel of a long term evolution (LTE) wireless network, comprises receiving from an evolved node b (eNB) a request for feedback of multipath-time delay and Doppler spreads estimated in the wireless communication downlink channel between the UE and eNB; estimating the multipath-time delay and Doppler spreads to establish the feedback of multipath-time delay and Doppler spreads; transmitting the feedback of multipath-time delay and Doppler spreads; and receiving a DMRS pattern configuration from the eNB, the DMRS configuration being based on the feedback of multipath-time delay and Doppler spreads.

There are some embodiments of the method, in which the transmitting of the feedback is made in response to the receiving of the request.

There are some embodiments of the method, in which the multipath-time delay and Doppler spreads are estimated in response to receiving the request.

There are some embodiments of the method, in which the request is made on an aperiodic basis.

There are some embodiments of the method, in which the request comprises a radio resource control (RRC) signaling parameter.

There are some embodiments of the method, in which the feedback of multipath-time delay and Doppler spreads comprises a radio resource control (RRC) signaling parameter.

There are some embodiments of the method, in which the multipath-time delay and Doppler spreads are estimated by quantizing the multipath-time delay and Doppler spreads according to a set of finite levels corresponding to predefined DMRS patterns.

There are some embodiments of the method, in which the DMRS pattern configuration is received in a downlink control information (DCI) message.

According to one embodiment of the present disclosure, a computer-readable medium configured to support adaptive demodulation reference signal (DMRS) transmission in a wireless communication downlink channel of a long term evolution (LTE) wireless network, has stored thereon, computer-executable instructions executable by a user equipment (UE) to cause the UE to receive from an evolved node b (eNB) a request for feedback of multipath-time delay and Doppler spreads estimated in the wireless communication downlink channel between the UE and eNB; estimate the multipath-time delay and Doppler spreads to establish the feedback of multipath-time delay and Doppler spreads; transmit the feedback of multipath-time delay and Doppler spreads; and receive a DMRS pattern configuration from the eNB, the DMRS configuration being based on the feedback of multipath-time delay and Doppler spreads.

There are some embodiments of the computer-readable medium, in which the request is made on an aperiodic basis.

There are some embodiments of the computer-readable medium, in which the request comprises a radio resource control (RRC) signaling parameter.

There are some embodiments of the computer-readable medium, in which the feedback of multipath-time delay and Doppler spreads comprises a radio resource control (RRC) signaling parameter.

There are some embodiments of the computer-readable medium, in which the multipath-time delay and Doppler spreads are estimated by quantizing the multipath-time delay and Doppler spreads according to a set of finite levels corresponding to predefined DMRS patterns.

There are some embodiments of the computer-readable medium, in which the DMRS pattern configuration is received in a downlink control information (DCI) message.

According to another embodiment of the present disclosure, a method, performed by a user equipment (UE), for signaling a desired demodulation reference signal (DMRS) pattern identified from among a predefined set of DMRS patterns associated with a downlink channel of a long term evolution (LTE) wireless network, comprises receiving from an evolved node b (eNB) a request for a DMRS indicator (DI) feedback identifying the desired DMRS pattern from among the predefined set of DMRS patterns; obtaining estimates of long-term channel properties defined by multipath-time delay and Doppler spreads; selecting a desired DMRS pattern from among the predefined set of DMRS patterns based on the multipath-time delay and Doppler spreads; and in response to receiving the request, transmitting to the eNB the DI feedback identifying the desired DMRS pattern from among the predefined set of DMRS patterns.

There are some embodiments of the method, further comprising receiving from the eNB a DMRS pattern configuration, the DMRS pattern configuration corresponding to the desired DMRS pattern of the DI feedback.

There are some embodiments of the method, further comprising receiving the request in a radio resource control (RRC) signaling parameter.

There are some embodiments of the method, further comprising transmitting the DI feedback in a radio resource control (RRC) signaling parameter.

There are some embodiments of the method, in which the DI feedback includes an index value corresponding to the selected DMRS pattern known to both the UE and the eNB.

There are some embodiments of the method, in which the DI feedback comprises a subband DI feedback applicable for a portion of a physical downlink shared channel (PDSCH) transmission including one or more physical resource blocks (PRBs) or resource block groups (RBGs).

There are some embodiments of the method, in which the request comprises a request for subband DI feedback.

There are some embodiments of the method, further comprising receiving the DMRS pattern configuration in a downlink control information (DCI) message.

According to another embodiment of the present disclosure, a computer-readable medium configured to facilitate signaling of a desired demodulation reference signal (DMRS) pattern identified from among a predefined set of DMRS patterns associated with a downlink channel of a long term evolution (LTE) wireless network, has stored thereon, computer-executable instructions executable by a user equipment (UE) to cause the UE to receive from an evolved node b (eNB) a request for a DMRS indicator (DI) feedback identifying the desired DMRS pattern from among the predefined set of DMRS patterns; obtain estimates of long-term channel properties defined by multipath-time delay and Doppler spreads; select a desired DMRS pattern from among the predefined set of DMRS patterns based on the multipath-time delay and Doppler spreads; and in response to receiving the request, transmit to the eNB the DI feedback identifying the desired DMRS pattern from among the predefined set of DMRS patterns.

There are some embodiments of the computer-readable medium, further comprising receiving from the eNB a DMRS pattern configuration, the DMRS pattern configuration corresponding to the desired DMRS pattern of the DI feedback.

There are some embodiments of the computer-readable medium, further comprising receiving the request in a radio resource control (RRC) signaling parameter.

There are some embodiments of the computer-readable medium, further comprising transmitting the DI feedback in a radio resource control (RRC) signaling parameter.

There are some embodiments of the computer-readable medium, in which the DI feedback includes an index value corresponding to the selected DMRS pattern known to both the UE and the eNB.

There are some embodiments of the computer-readable medium, in which the DI feedback comprises a subband DI feedback applicable for a portion of a physical downlink shared channel (PDSCH) transmission including one or more physical resource blocks (PRBs) or resource block groups (RBGs).

There are some embodiments of the computer-readable medium, in which the request comprises a request for subband DI feedback.

There are some embodiments of the computer-readable medium, further comprising receiving the DMRS pattern configuration in a downlink control information (DCI) message.

According to another embodiment of the present disclosure, a method, performed by an evolved node b (eNB), for selecting, and transmitting to a user equipment (UE), a demodulation reference signal (DMRS), comprises transmitting a request for adaptive DMRS feedback; receiving from the UE the adaptive DMRS feedback; determining, based on the adaptive DMRS feedback, a DMRS pattern from among a predefined set of DMRS patterns; signaling the determined DMRS pattern to the UE; and transmitting the DMRS during a physical downlink shared channel (PDSCH) transmission.

There are some embodiments of the method, in which the adaptive DMRS feedback comprises wireless channel parameter feedback including multipath-time delay and Doppler spreads.

There are some embodiments of the method, in which the adaptive DMRS feedback comprises an indication of a desired DMRS pattern selected by the UE.

There are some embodiments of the method, in which the request is transmitted using radio resource control (RRC) signaling.

There are some embodiments of the method, in which, in response to receiving the adaptive DMRS feedback, the determined DMRS pattern is signaled by transmitting radio resource control (RRC) signaling to reconfigure the UE to receive the DMRS used in the PDSCH transmission.

There are some embodiments of the method, in which, in response to receiving the adaptive DMRS feedback, the determined DMRS pattern is signaled by dynamically configuring the determined DMRS pattern in a downlink control information (DCI) message carried in the PDCCH/enhanced PDCCH (EPDCCH).

According to another embodiment of the present disclosure, a computer-readable medium configured to facilitate selecting, and transmitting to a user equipment (UE), a demodulation reference signal (DMRS), has stored thereon, computer-executable instructions executable by an evolved node b (eNB) to cause the eNB to transmit a request for adaptive DMRS feedback; receive from the UE the adaptive DMRS feedback; determine, based on the adaptive DMRS feedback, a DMRS pattern from among a predefined set of DMRS patterns; signal the determined DMRS pattern to the UE; and transmit the DMRS during a physical downlink shared channel (PDSCH) transmission.

There are some embodiments of the computer-readable medium, in which the adaptive DMRS feedback comprises wireless channel parameter feedback including multipath-time delay and Doppler spreads.

There are some embodiments of the computer-readable medium, in which the adaptive DMRS feedback comprises an indication of a desired DMRS pattern selected by the UE.

There are some embodiments of the computer-readable medium, in which the request is transmitted using radio resource control (RRC) signaling.

There are some embodiments of the computer-readable medium, in which, in response to receiving the adaptive DMRS feedback, the determined DMRS pattern is signaled by transmitting radio resource control (RRC) signaling to reconfigure the UE to receive the DMRS used in the PDSCH transmission.

There are some embodiments of the computer-readable medium, in which, in response to receiving the adaptive DMRS feedback, the determined DMRS pattern is signaled by dynamically configuring the determined DMRS pattern in a downlink control information (DCI) message carried in the PDCCH/enhanced PDCCH (EPDCCH).

The techniques introduced above can be implemented by programmable circuitry programmed or configured by software and/or firmware, or they can be implemented entirely by special-purpose hardwired circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, one or more processors may be configured with instructions stored on a computer-readable storage device.

It will be understood by skilled persons that many changes may be made to the details of the above-described embodiments without departing from the underlying principles of the invention. The scope of the present invention should, therefore, be determined only by the following claims.

The invention claimed is:

1. A user equipment (UE) to support adaptive demodulation reference signal (DMRS) transmission in a wireless communication downlink channel of a long term evolution (LTE) wireless network, the UE comprising:
   a receiver configured to receive from an evolved node b (eNB) a request for feedback of multipath-time delay and Doppler spreads estimated in the wireless communication downlink channel between the UE and eNB;
   a transmitter; and
   circuitry operatively coupled to the receiver and transmitter, the circuitry configured to:
      estimate the multipath-time delay and Doppler spreads by quantizing the multipath-time delay and Doppler spreads according to a set of finite levels corresponding to predefined DMRS patterns to establish the feedback of multipath-time delay and Doppler spreads;
      in response to the receiver receiving the request, cause the transmitter to transmit the feedback of multipath-time delay and Doppler spreads; and
      obtain with the receiver, a DMRS pattern configuration from the eNB, the DMRS configuration being based on the feedback of multipath-time delay and Doppler spreads.

2. The UE of claim 1, in which the circuitry is further configured to estimate the multipath-time delay and Doppler spreads in response to the receiver receiving the request.

3. The UE of claim 1, in which the request is made on an aperiodic basis.

4. The UE of claim 1, in which the receiver is configured to receive the request in a radio resource control (RRC) signaling parameter.

5. The UE of claim 1, in which the transmitter is configured to transmit the feedback of multipath-time delay and Doppler spreads in a radio resource control (RRC) signaling parameter.

6. The UE of claim 1, in which the receiver is configured to receive the DMRS pattern configuration in a downlink control information (DCI) message.

7. A user equipment (UE) to signal a desired demodulation reference signal (DMRS) pattern identified from among a predefined set of DMRS patterns associated with a downlink channel of a long term evolution (LTE) wireless network, the UE comprising:
 a receiver to receive from an evolved node b (eNB) a request for a DMRS indicator (DI) feedback identifying the desired DMRS pattern from among the predefined set of DMRS patterns;
 a transmitter; and
 circuitry operatively coupled to the receiver and transmitter, the circuitry configured to:
  obtain estimates of long-term channel properties defined by multipath-time delay and Doppler spreads; and
  select a desired DMRS pattern from among the predefined set of DMRS patterns based on the multipath-time delay and Doppler spreads; and
  in response to receiving the request, cause the transmitter to transmit to the eNB the DI feedback identifying the desired DMRS pattern from among the predefined set of DMRS patterns.

8. The UE of claim 7, in which the receiver is further configured to receive from the eNB a DMRS pattern configuration, the DMRS pattern configuration corresponding to the desired DMRS pattern of the DI feedback.

9. The UE of claim 7, in which the receiver is configured to receive the request in a radio resource control (RRC) signaling parameter.

10. The UE of claim 7, in which the transmitter is configured to transmit the DI feedback in a radio resource control (RRC) signaling parameter.

11. The UE of claim 7, in which the DI feedback includes an index value corresponding to the selected DMRS pattern known to both the UE and the eNB.

12. The UE of claim 7, in which the DI feedback comprises a subband DI feedback applicable for a portion of a physical downlink shared channel (PDSCH) transmission including one or more physical resource blocks (PRBs) or resource block groups (RBGs).

13. The UE of claim 7, in which the request comprises a request for subband DI feedback.

14. The UE of claim 7, in which the receiver is configured to receive the DMRS pattern configuration in a downlink control information (DCI) message.

15. An evolved node b (eNB) configured to select, and transmit to a user equipment (UE), a demodulation reference signal (DMRS), the eNB comprising:
 a transmitter configured to transmit a request for adaptive DMRS feedback, the adaptive DMRS feedback including an indication of a desired DMRS pattern selected by the UE;
 a receiver configured to receive from the UE the adaptive DMRS feedback; and
 circuitry configured to:
  determine, based on the adaptive DMRS feedback, a DMRS pattern from among a predefined set of DMRS patterns;
  signal the determined DMRS pattern to the UE; and
  cause the transmitter to transmit the DMRS during a physical downlink shared channel (PDSCH) transmission.

16. The eNB of claim 15, in which the adaptive DMRS feedback comprises wireless channel parameter feedback including multipath-time delay and Doppler spreads.

17. The eNB of claim 15, in which the request is transmitted using radio resource control (RRC) signaling.

18. The eNB of claim 15, in which, in response to receiving the adaptive DMRS feedback, the circuitry is further configured to signal the determined DMRS pattern by transmitting radio resource control (RRC) signaling to reconfigure the UE to receive the DMRS used in the PDSCH transmission.

19. The eNB of claim 15, in which, in response to receiving the adaptive DMRS feedback, the circuitry is further configured to signal the determined DMRS pattern by dynamically configuring the determined DMRS pattern in a downlink control information (DCI) message carried in the PDCCH/enhanced PDCCH (EPDCCH).

\* \* \* \* \*